(12) United States Patent
Miyazawa et al.

(10) Patent No.: US 11,441,660 B2
(45) Date of Patent: Sep. 13, 2022

(54) HOLLOW STRAIN-WAVE GEAR DEVICE

(71) Applicant: HARMONIC DRIVE SYSTEMS INC., Tokyo (JP)

(72) Inventors: Yutaka Miyazawa, Azumino (JP); Noboru Takizawa, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 65 days.

(21) Appl. No.: 17/056,213

(22) PCT Filed: Jun. 19, 2018

(86) PCT No.: PCT/JP2018/023364
§ 371 (c)(1),
(2) Date: Nov. 17, 2020

(87) PCT Pub. No.: WO2019/244258
PCT Pub. Date: Dec. 26, 2019

(65) Prior Publication Data
US 2021/0222764 A1  Jul. 22, 2021

(51) Int. Cl.
*F16H 49/00* (2006.01)
(52) U.S. Cl.
CPC .................. *F16H 49/001* (2013.01)
(58) Field of Classification Search
CPC .................................................. F16H 49/001
See application file for complete search history.

(56) References Cited

U.S. PATENT DOCUMENTS

| 8,384,260 B2 * | 2/2013 | Kanayama | H02K 11/21 310/90 |
| 2019/0186599 A1 * | 6/2019 | Tang | F16H 49/001 |
| 2020/0284333 A1 * | 9/2020 | Kiyosawa | F16C 17/10 |
| 2021/0071745 A1 * | 3/2021 | Maniwa | F16H 49/001 |

(Continued)

FOREIGN PATENT DOCUMENTS

| JP | H032945 U | 1/1991 |
| JP | 2014206265 A | 10/2014 |
| WO | 2015001582 A1 | 1/2015 |

OTHER PUBLICATIONS

International Search Report (PCT/ISA/210) and translation and Written Opinion (PCT/ISA/237) dated Sep. 25, 2018, by the Japanese Patent Office as the International Searching Authority for International Application No. PCT/JP2018/023364.

*Primary Examiner* — Terence Boes
(74) *Attorney, Agent, or Firm* — Buchanan Ingersoll & Rooney PC (57) ABSTRACT

A hollow strain-wave gear device (1) has a wave generator (5), a wave generator plug (5a) of which is integrally formed in a portion of a hollow rotating shaft (6). A plug reinforcement part (5d), which is adjacent to the wave generator plug (5a), has a thickness larger than that of the wave generator plug (5a), and is integrally formed in the hollow rotating shaft (6). The wave generator plug (5a) is reinforced by the highly rigid plug reinforcement part (5d) formed adjacently to the wave generator plug (5a). It is thus possible to prevent or suppress a decline in the rigidity of the wave generator plug (5a) when the hollow rotating shaft has a thin thickness in order to reduce the weight of the hollow rotating shaft (6) and increase the diameter of the hollow portion thereof. Consequently, it is possible to suppress a decline in ratcheting torque.

2 Claims, 4 Drawing Sheets

(56) References Cited

U.S. PATENT DOCUMENTS

2021/0197365 A1* 7/2021 Cheng ................... F16H 49/001
2021/0396303 A1* 12/2021 Kanayama .......... F16H 57/0482
2021/0404544 A1* 12/2021 Kimura ................ F16H 49/001

* cited by examiner

HOLLOW STRAIN-WAVE GEAR DEVICE

TECHNICAL FIELD

The present invention relates to a strain-wave gear device, and in particular relates to a hollow strain-wave gear device provided with a hollow section extending through a central portion along an axial direction.

BACKGROUND ART

A hollow strain-wave gear device is disclosed in, e.g., Patent Document 1 (WO 2015/001582). In the hollow strain-wave gear device disclosed in Patent Document 1, a flexible top-hat-shaped externally toothed gear is arranged coaxially inside a rigid internally toothed gear, a wave generator is coaxially arranged inside the externally toothed gear, and a hollow rotating shaft coaxially passes through a central portion of the wave generator. The wave generator has a wave generator plug provided with an ellipsoidal outer-peripheral surface, and wave generator bearings mounted between the ellipsoidal outer-peripheral surface and an inner-peripheral surface of the externally toothed gear. The wave generator plug is formed integrally with the hollow rotating shaft, which is an input shaft. Specifically, the ellipsoidal outer-peripheral surface is formed on a part of the circular outer-peripheral surface of the hollow rotating shaft, and a shaft portion at which the ellipsoidal outer-peripheral surface is formed functions as the wave generator plug.

PRIOR-ART DOCUMENTS

Patent Documents

Patent Document 1: WO 2015/001582

SUMMARY OF THE INVENTION

Problems to be Solved by the Invention

In hollow strain-wave gear devices, there are cases where there is a demand to increase the diameter of a hollow section of the device without increasing the outside diameter of the device. There are also cases where there is a demand to reduce the wall thickness of a wave generator plug in order to reduce the weight of the device. When the diameter of the hollow section with which the wave generator plug is integrally formed is increased, or when the wall thickness of a hollow rotating shaft or of the wave generator plug is reduced, in order to satisfy such demands, torque performance also decreases due to a reduction in the rigidity of a wave generator.

It is an object of the present invention to provide a hollow strain-wave gear device in which any reduction in torque performance can be prevented or suppressed in cases where the wall thickness of a hollow rotating shaft or of a wave generator plug is reduced in order to, inter alia, increase the diameter of a hollow section.

Means to Solve the Problems

In order to solve the problem described above, a hollow strain-wave gear device of the present invention is characterized by having:
a rigid internally toothed gear;
an externally toothed gear arranged coaxially inside the internally toothed gear, the externally toothed gear having a flexible cylindrical part on which are formed external teeth capable of meshing with internal teeth of the internally toothed gear;
a wave generator arranged coaxially inside the cylindrical part of the externally toothed gear, the wave generator causing the cylindrical part to flex in an ellipsoidal shape and mesh with the internal teeth of the internally toothed gear at two circumferential-direction locations, and, when driven so as to rotate, causing the positions where the external teeth mesh with the internal teeth to move along the circumferential direction; and
a hollow rotating shaft coaxially extending through the wave generator,
the wave generator having:
a wave generator plug provided with an ellipsoidal outer-peripheral surface;
a plug reinforcement part arranged in order to increase a rigidity of the wave generator plug; and
a wave generator bearing mounted between the ellipsoidal outer-peripheral surface and an inner-peripheral surface of the cylindrical part of the externally toothed gear,
a shaft portion that defines the wave generator plug and a shaft portion that defines the plug reinforcement part being formed integrally with the hollow rotating shaft,
the plug reinforcement part being formed in the hollow rotating shaft at a position adjacent to the wave generator plug in a center-axis direction of the hollow rotating shaft, and
the radial-direction wall thickness of the plug reinforcement part being greater than the radial-direction wall thickness of the wave generator plug.

In the hollow strain-wave gear device of the present invention, the plug reinforcement part, which has a greater wall thickness than the wave generator plug, is formed adjacent to the wave generator plug in the hollow rotating shaft. The wave generator plug is reinforced by the high-rigidity plug reinforcement part, which is formed in a particular location adjacent to the wave generator plug. Even though the hollow rotating shaft is formed so as to have a low wall thickness in order to enlarge a hollow section of the hollow rotating shaft, it is possible to prevent or suppress any reduction in the rigidity of the wave generator plug and to suppress any reduction in torque performance (ratcheting). Because the high-wall-thickness plug reinforcement part is only formed partially in a position adjacent to the wave generator plug in the hollow rotating shaft, it is possible to minimize any increase in the weight and inertia of the hollow rotating shaft.

The inner-peripheral surfaces of the wave generator plug and the plug reinforcement part in the hollow rotating shaft are formed as circular inner-peripheral surfaces having the same diameter at individual positions along a center-axis direction. In this case, the outer-peripheral surface of the plug reinforcement part is formed so as to have an outside diameter greater than the long diameter of the ellipsoidal shape that defines the ellipsoidal outer-peripheral surface of the wave generator plug at individual positions along the center-axis direction. Because the high-wall-thickness plug reinforcement part is formed by being built up on the outer-peripheral-surface side of the hollow rotating shaft, it is possible to ensure the diameter of the hollow section.

The high-wall-thickness plug reinforcement part, which is formed in a particular location adjacent to the wave generator plug, can be used as a counterweight of the wave generator plug in the hollow rotating shaft. For example, the outer-peripheral surface of the plug reinforcement part is formed as an ellipsoidal outer-peripheral surface having a phase difference of 90 degrees about the center axis with respect to the ellipsoidal outer-peripheral surface of the wave generator plug.

Furthermore, in cases involving a cup-shaped or top-hat-shaped strain-wave gear device, a dead space can be formed between the inner-peripheral surface of the cylindrical part of the externally toothed gear, which is formed in a cup shape or a top-hat shape, and the outer-peripheral surface of the hollow rotating shaft. If the high-wall-thickness plug reinforcement part is arranged using the dead space, then, inter alia, design changes to other portions of the strain-wave gear device will be unnecessary.

MODE FOR CARRYING OUT THE INVENTION

Embodiments of a hollow strain-wave gear device according to embodiments of the present invention are described below with reference to the accompanying drawings.

Figure 1:
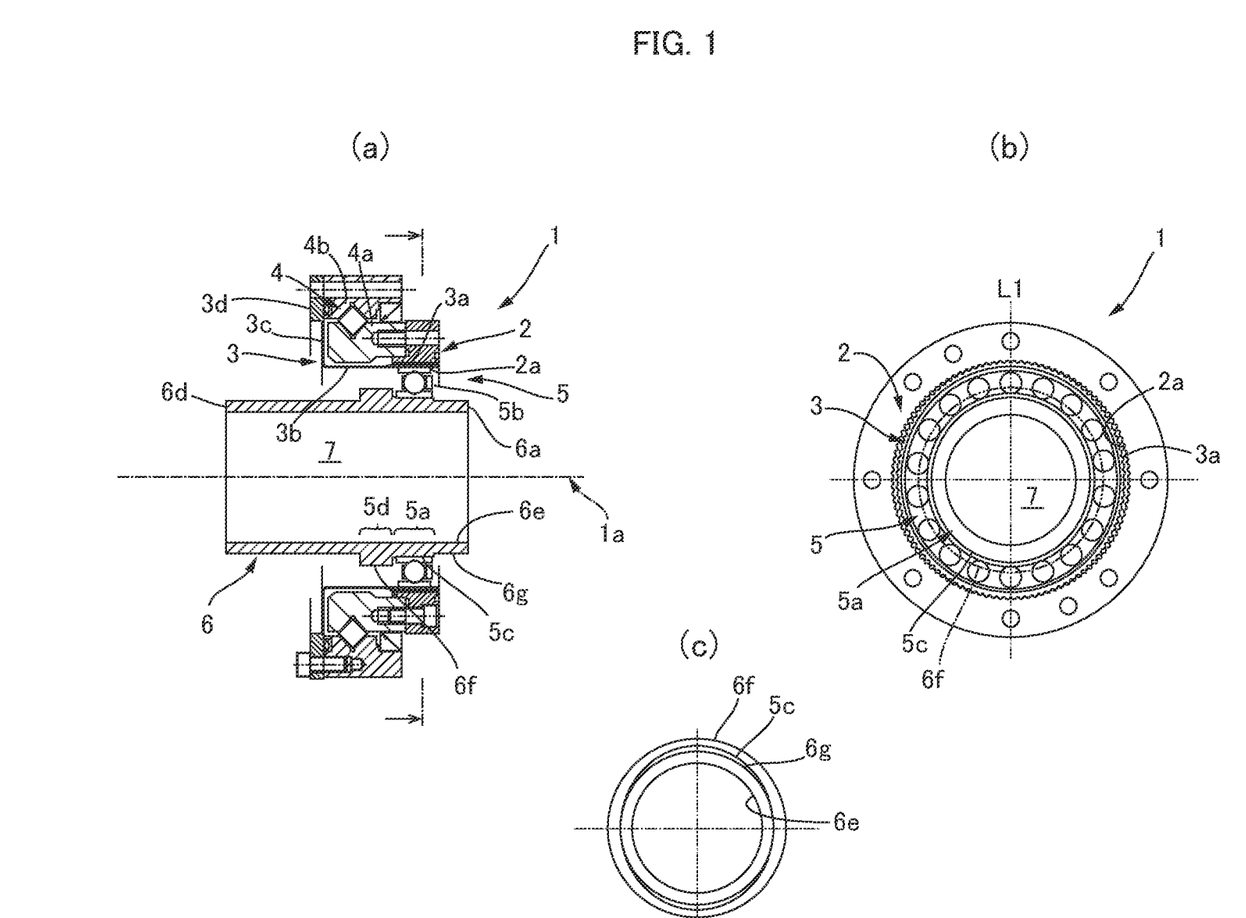
FIG. 1 includes a schematic vertical cross-sectional view and a schematic horizontal cross-sectional view of a hollow strain-wave gear device to which the present invention is applied, and an explanatory diagram showing a contour shape of individual components.

FIG. 1(a) is a schematic vertical cross-sectional view of a hollow strain-wave gear device according to an embodiment, and FIG. 1(b) is a schematic horizontal cross-sectional view of the same. A hollow strain-wave gear device 1 has a rigid internally toothed gear 2 formed in an annular shape. A flexible externally toothed gear 3 formed in a top-hat shape is arranged coaxially inside the internally toothed gear 2. External teeth 3a of the externally toothed gear 3 are capable of meshing with internal teeth 2a of the internally toothed gear 2. The internally toothed gear 2 and the externally toothed gear 3 are held by a bearing (cross-roller bearing 4 in the present example) in a state allowing for relative rotation. A wave generator 5 is arranged coaxially inside the externally toothed gear 3. A hollow rotating shaft 6 (hollow input shaft) coaxially passes through a central portion of the wave generator 5. A hollow section of the hollow rotating shaft 6 is a device hollow section 7 extending therethrough along a center-axis 1a direction.

In the hollow strain-wave gear device 1, the externally toothed gear 3 is caused by the wave generator 5 to flex in an ellipsoidal shape, and meshes with the internally toothed gear 2 at both ends along a long axis L1 of the externally toothed gear 3. When the wave generator 5 rotates due to rotational force transmitted via the hollow rotating shaft 6, positions of meshing between the two gears 2, 3 move along the circumferential direction, and relative rotation that corresponds to the difference between the numbers of teeth of the two gears 2, 3 occurs therebetween. When the internally toothed gear 2 is secured, reduced rotation is outputted from the externally toothed gear 3.

The structures of the components are described below. The internally toothed gear 2 is tightly secured in a coaxial manner by bolts (not shown) to an end surface of an inner race 4a of the cross-roller bearings 4. The externally toothed gear 3 comprises a cylindrical part 3b capable of flexing in the radial direction, a diaphragm 3c extending radially outward from one end of the cylindrical part 3b, and a rigid boss 3d that is formed in an annular shape and is formed integrally with the outer-peripheral edge of the diaphragm 3c. The external teeth 3a are formed on an outer-peripheral-surface portion of another end of the cylindrical part 3b. The cross-roller bearing 4 are arranged between the boss 3d and the internally toothed gear 2. The boss 3d of the externally toothed gear 3 is tightly secured in a coaxial manner by bolts (not shown) to an outer race 4b of the cross-roller bearing 4.

The wave generator 5 has a rigid wave generator plug 5a and wave generator bearing 5b. The outer-peripheral surface of the wave generator plug 5a is formed as an ellipsoidal outer-peripheral surface 5c. The wave generator bearing 5b is mounted between the ellipsoidal outer-peripheral surface 5c and an inner-peripheral surface of the cylindrical part 3b of the externally toothed gear 3. In addition, a plug reinforcement part 5d is provided to the wave generator 5 in order to increase the rigidity of the wave generator plug 5a.

The hollow rotating shaft 6 extends through a central portion of the wave generator 5 toward both sides along the center-axis 1a direction. A motor rotating shaft or other rotating shaft (not shown) is coaxially connected and secured to one shaft end section 6a of the hollow rotating shaft 6. In the present example, a plug shaft portion that defines the wave generator plug 5a and a plug reinforcement shaft portion that defines the plug reinforcement part 5d are formed integrally with the hollow rotating shaft 6.

The hollow rotating shaft 6 is provided with a circular inner-peripheral surface 6e having substantially the same inside diameter from an input-side shaft end section 6a thereof to an opposite-side shaft end section 6d thereof. In the hollow rotating shaft 6, the device hollow section 7 is defined by the circular inner-peripheral surface 6e. The wave generator plug 5a and the plug reinforcement part 5d are formed integrally with a shaft portion that is located partway along the hollow rotating shaft 6 from the input-side-shaft-end-part 6a side toward the opposite-side shaft end part 6d. Shaft portions of the hollow rotating shaft 6, other than the shaft portion at which the wave generator plug 5a and the plug reinforcement part 5d are formed, are formed as circular outer-peripheral surfaces 6g having substantially the same outside diameter.

In the hollow rotating shaft 6, the plug reinforcement part 5d is formed at a position that is adjacent to the wave generator plug 5a in the center-axis 1a direction. The radial-direction wall thickness of the plug reinforcement part 5d is greater than the radial-direction wall thickness of the wave generator plug 5a. FIG. 1(c) shows contour shapes of the plug reinforcement part 5d, the wave generator plug 5a, and a portion of the hollow rotating shaft 6 other than the aforementioned portions. As shown in FIG. 1(c), in the present example, the plug reinforcement part 5d has a circular outer-peripheral surface 6f, and the outside diameter of the circular outer-peripheral surface 6f is greater than the long diameter of the ellipsoidal shape that defines the ellipsoidal outer-peripheral surface 5c of the wave generator plug 5a. The wave generator plug 5a is arranged at a position inside the cylindrical part 3b of the externally toothed gear 3 that corresponds to the external teeth 3a, and the plug reinforcement part 5d is formed at a position that is adjacent to the wave generator plug 5a on the shaft-end-part 6d side so as to be positioned inside the cylindrical part 3b.

The plug reinforcement part 5d, which has a greater wall thickness than the wave generator plug 5a, is formed in the hollow strain-wave gear device 1 so as to be adjacent to the wave generator plug 5a in the hollow rotating shaft 6. The wave generator plug 5a is reinforced by the plug reinforcement part 5d, which has high rigidity and is formed in a particular location adjacent to the wave generator plug 5a. Even though the hollow rotating shaft 6 is formed so as to have a low wall thickness in order to increase the diameter of the device hollow section 7, it is possible to prevent or suppress any reduction in the rigidity of the wave generator plug 5a by means of the plug reinforcement part 5d. In addition, because the high-wall-thickness plug reinforcement part 5d is formed in a particular location at a position adjacent to the wave generator plug 5a, it is possible to impart required rigidity to the wave generator plug 5a and to minimize any increase in the weight and inertia of the hollow rotating shaft 6. Thus, it is possible to suppress any reduction in the ratcheting torque of the hollow strain-wave gear device 1.

In the present example, the plug reinforcement part 5d is a portion that is built up in a particular location on the outer-peripheral surface of the hollow rotating shaft 6, and the inner-peripheral surface of the hollow rotating shaft 6 is formed as the circular inner-peripheral surface 6e having the same diameter at individual positions along the center-axis 1a direction. Because the high-wall-thickness plug reinforcement part 5d is formed by being built up on the circular-outer-peripheral-surface side of the hollow rotating shaft 6, it is possible to form the device hollow section 7 of the hollow rotating shaft 6 so as to have a large inside diameter.

Furthermore, the high-wall-thickness plug reinforcement part 5d is formed using a dead space formed between the inner-peripheral surface of the cylindrical part 3b of the top-hat-shaped externally toothed gear 3 and the outer-peripheral surface of the hollow rotating shaft 6. Design changes pertaining to, inter alia, the shapes of other portions of the hollow strain-wave gear device 1 are unnecessary.

The high-wall-thickness plug reinforcement part 5d, which is formed in a particular location adjacent to the wave generator plug 5a, can be used as a counterweight of the wave generator plug 5a in the hollow rotating shaft 6. In such cases, it is preferable to, for example, form the circular outer-peripheral surface 6f of the plug reinforcement part 5d into an ellipsoidal outer-peripheral surface having a phase difference of 90 degrees about the center axis 1a with respect to the ellipsoidal outer-peripheral surface 5c of the wave generator plug 5a, and achieve a balance in weight between the wave generator plug 5a and the plug reinforcement part 5d during rotation of the hollow rotating shaft 6.

(Example of Hollow Strain-Wave Gear Device Provided with Plug Reinforcement Part)

Figure 2:
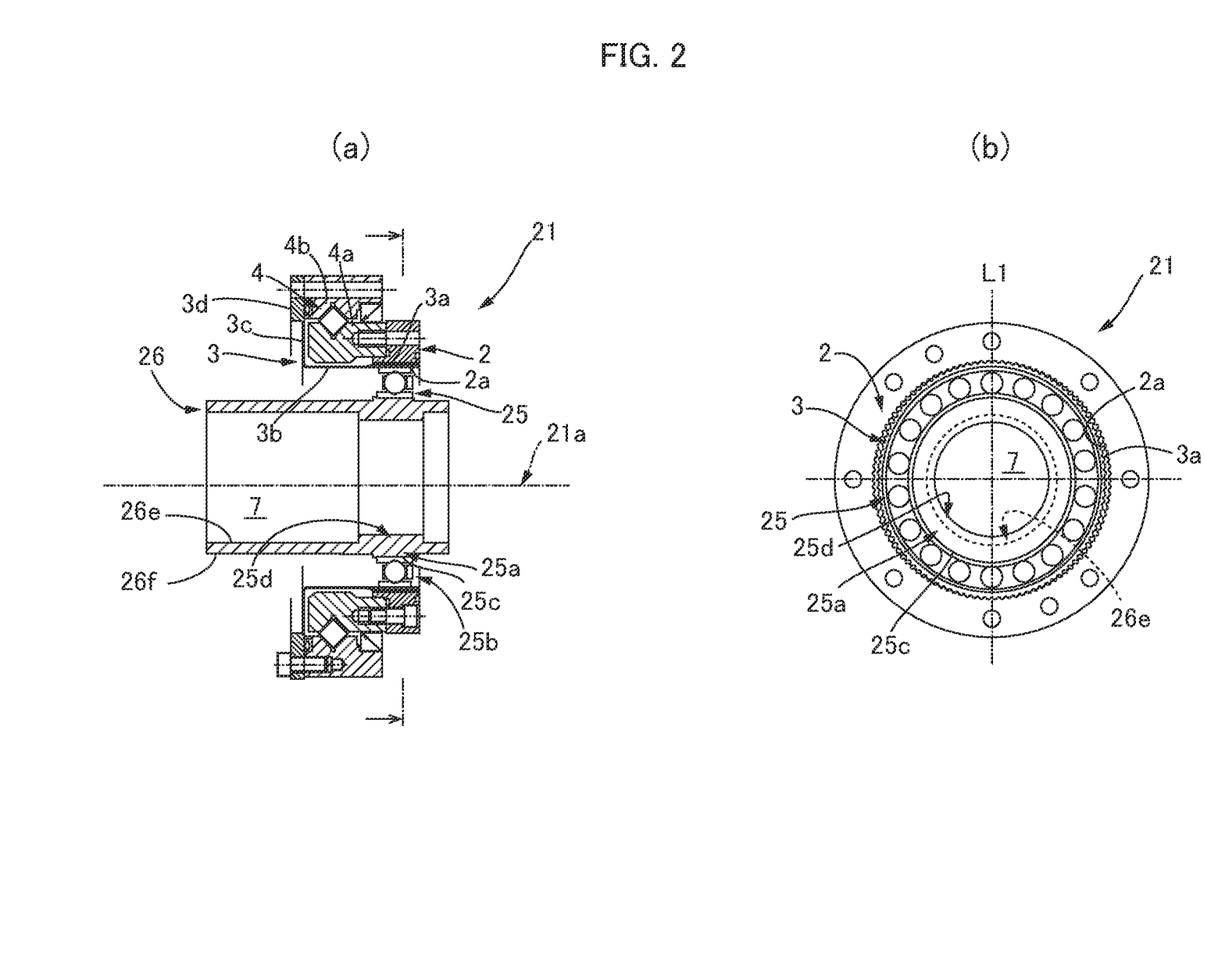
FIG. 2 is a schematic vertical cross-sectional view and a schematic horizontal cross-sectional view of an example of a hollow strain-wave gear device having a plug reinforcement part.

FIG. 2(a) is a schematic vertical cross-sectional view of another example of a hollow strain-wave gear device provided with a plug reinforcement part, and FIG. 2(b) is a schematic horizontal cross-sectional view of the same. The basic configuration of a hollow strain-wave gear device 21 is the same as that of the hollow strain-wave gear device 1 in the embodiment described above; therefore, the same reference symbols are used for corresponding portions, and description thereof is omitted. Differing portions are described below.

In the hollow strain-wave gear device 21 as well, a wave generator 25 has a rigid wave generator plug 25a and wave generator bearings 25b. An outer-peripheral surface of the wave generator plug 25a is formed as an ellipsoidal outer-peripheral surface 25c. The wave generator bearing 25b is mounted between the ellipsoidal outer-peripheral surface 25c and an inner-peripheral surface of a cylindrical part 3b of an externally toothed gear 3. In addition, a plug reinforcement part 25d is provided to the wave generator 25 in order to increase the rigidity of the wave generator plug 25a.

The wave generator plug 25a is formed integrally with an outer-peripheral-surface-side portion of a hollow rotating shaft 26. Specifically, the ellipsoidal outer-peripheral surface 25c is formed due to one part of a circular outer-peripheral surface 26f of the hollow rotating shaft 26 protruding radially outward at a fixed width. The plug reinforcement part 25d is formed integrally with an inner-peripheral-surface-side portion of the hollow rotating shaft 26. Specifically, the plug reinforcement part 25d, which is an inner-peripheral-surface built-up portion, is formed due to a circular inner-peripheral surface 26e of the hollow rotating shaft 26 protruding radially inward at a fixed width around the entire circumference at a shaft portion at which the wave generator plug 25a is integrally formed. The width of the plug reinforcement part 25d in a center-axis 21a direction is set to a dimension encompassing the portion where the wave generator plug 25a is formed.

In the hollow strain-wave gear device 21, the plug reinforcement part 25d, which is defined by the inner-peripheral-surface built-up portion, is formed in the hollow rotating shaft 26 at a shaft portion at which the wave generator plug 25a is formed. The wave generator plug 25a is reinforced by the plug reinforcement part 25d, which is composed of the inner-peripheral-surface built-up portion formed in a particular location on the inner-peripheral surface of the hollow rotating shaft 26. In cases where the entirety of the hollow rotating shaft 26 is reduced in wall thickness to reduce the weight thereof, it is possible to prevent or suppress any reduction in the rigidity of the low-wall-thickness wave generator plug 25a by means of the plug reinforcement part 25d. In addition, because the plug reinforcement part 25d is provided to a part of the hollow rotating shaft 26, it is possible to minimize any increase in the weight and inertia of the hollow rotating shaft 26. Thus, it is possible to suppress any reduction in the ratcheting torque of the hollow strain-wave gear device 21 in cases where the hollow rotating shaft 26, in which the wave generator plug 25a is integrally formed, is reduced in wall thickness to reduce the weight thereof.

(Another Example of Hollow Strain-Wave Gear Device Provided with Plug Reinforcement Part)

Figure 3:
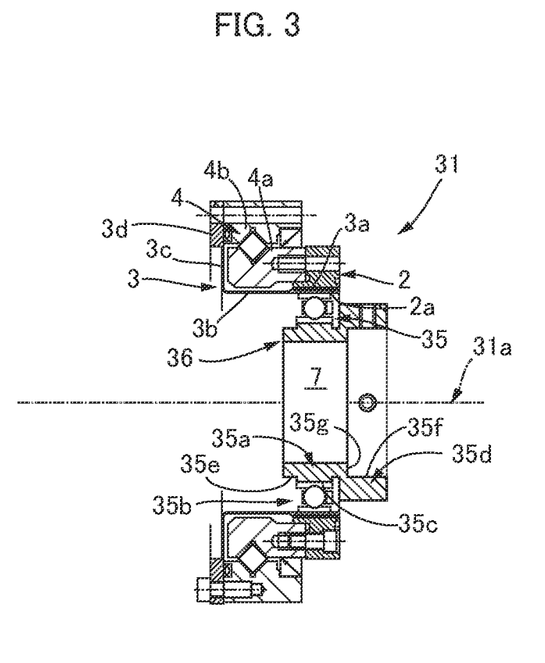
FIG. 3 is a schematic vertical cross-sectional view of another example of a hollow strain-wave gear device having a plug reinforcement part.

FIG. 3 is a vertical cross-sectional view of another example of a hollow strain-wave gear device provided with a plug reinforcement part. The basic configuration of a hollow strain-wave gear device 31 is the same as that of the hollow strain-wave gear device 1 in the embodiment described above; therefore, the same reference symbols are used for corresponding portions, and description thereof is omitted. Differing portions are described below.

In the hollow strain-wave gear device 31, a wave generator 35 has a wave generator plug 35a and wave generator bearings 35b. The wave generator plug 35a is formed integrally with part of a hollow rotating shaft 36. An ellipsoidal outer-peripheral surface 35c is formed on the outer-peripheral surface of the wave generator plug 35a. The wave generator bearings 35b are mounted between the ellipsoidal outer-peripheral surface 35c and an inner-peripheral surface of a cylindrical part 3b of an externally toothed gear 3. In addition, a plug reinforcement part 35d for increasing the rigidity of the wave generator plug 35 is formed integrally with the hollow rotating shaft 36.

More specifically, the hollow rotating shaft 36 in the present example is formed from: the wave generator plug 35a (plug cylindrical part), which is formed in a small-diameter cylindrical shape; and the plug reinforcement part 35d, which is formed in a large-diameter cylindrical shape and which is coaxially linked to one-end side of the wave generator plug 35a. The ellipsoidal outer-peripheral surface 35c, which protrudes outward and has a fixed width, is formed on a circular outer-peripheral surface 35e of the wave generator plug 35a.

The plug reinforcement part 35d linked to the end of the wave generator plug 35a protrudes outward from the cylindrical part 3b of the externally toothed gear 3 along a central axis 31a and is located at a position adjacent to the wave generator bearings 35b in the center-axis 31a direction. The plug reinforcement part 35d has a greater wall thickness than the wall thickness of the wave generator plug 35a, and a circular inner-peripheral surface 35f of the plug reinforcement part 35d is formed so as to have substantially the same inside diameter as the outside diameter of the wave generator plug 35a. An annular end surface 35g of the wave generator plug 35a is positioned at one end of the circular inner-peripheral surface 35f. The plug reinforcement part 35d has formed therein a shaft hole portion for inserting and securing a motor rotating shaft or other rotating shaft, and the inserted rotating shaft (not shown) comes into contact with the annular end surface 35g and is positioned in the axial direction.

There may be cases where, in order to increase the inside diameter of a hollow section of the hollow rotating shaft 36 with which the wave generator plug 35a is integrally formed, and to reduce the weight and inertia of the hollow rotating shaft 36, the wall thickness of the hollow rotating shaft 36 is decreased. When the hollow rotating shaft 36 is formed so as to have a low wall thickness, the wave generator plug 35a will also have a low wall thickness and have reduced rigidity, and there may be cases where it is impossible to ensure the rigidity required in order for the externally toothed gear 3 to flex in an ellipsoidal shape and reliably mesh with the internally toothed gear 2.

In the present example, the plug reinforcement part 35d for reinforcing the wave generator plug 35a is formed in the hollow rotating shaft 36. Due to the plug reinforcement part 35d, it is possible to increase the inside diameter of the device hollow section 7, and the required rigidity is imparted to the wave generator plug 35a. It is possible to reduce the weight of the hollow rotating shaft 36 in which the wave generator plug 35a is formed, and at the same time to ensure rigidity and prevent or suppress any reduction in ratcheting torque.

(Example of Cup-Shaped Strain-Wave Gear Device Provided with Plug Reinforcement Part)

Figure 4:
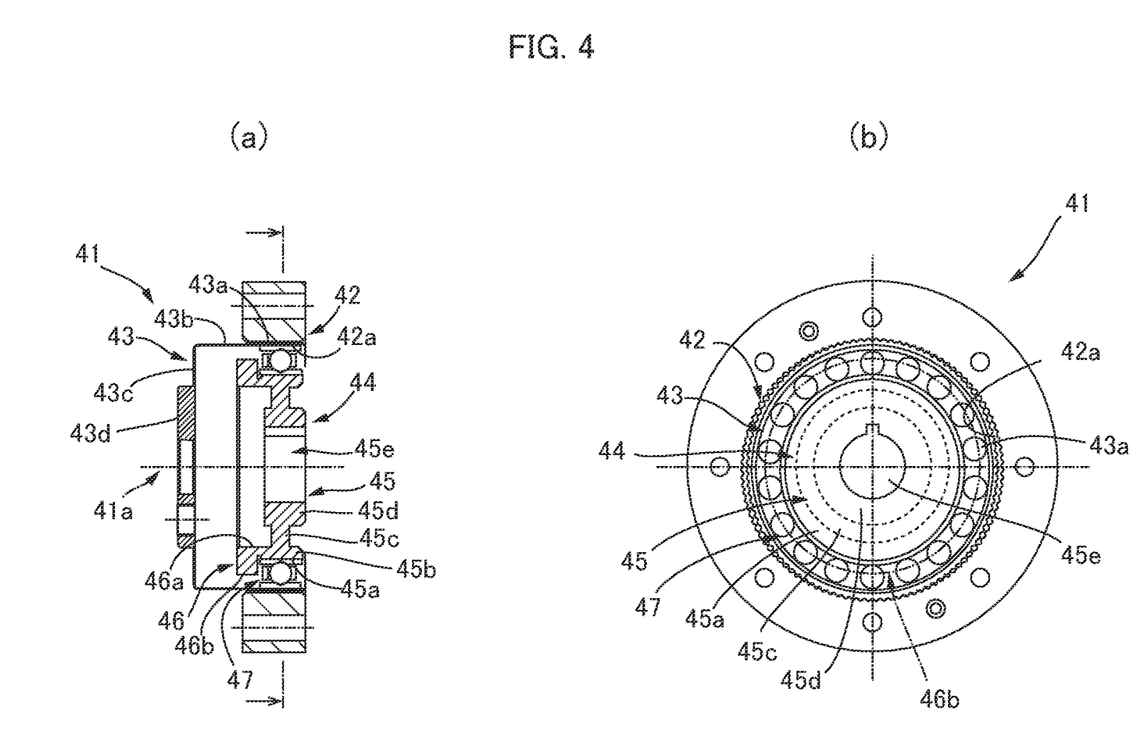
FIG. 4 is a schematic vertical cross-sectional view and a schematic horizontal cross-sectional view of a cup-shaped strain-wave gear device having a plug reinforcement part.

FIG. 4(a) is a schematic vertical cross-sectional view of a cup-shaped strain-wave gear device provided with a plug reinforcement part, and FIG. 4(b) is a schematic horizontal cross-sectional view of the same. A cup-shaped strain-wave gear device 41 has a cup-shaped flexible externally toothed gear 43 arranged coaxially inside a rigid internally toothed gear 42. The externally toothed gear 43 has a flexible cylindrical part 43b on which are formed external teeth 43a capable of meshing with internal teeth 42a of the internally toothed gear 42. A wave generator 44 is arranged coaxially inside the cylindrical part 43b of the externally toothed gear 43. The wave generator 44 causes the cylindrical part 43b of the externally toothed gear 43 to flex in an ellipsoidal shape and to partially mesh with the internal teeth 42a of the internally toothed gear 42 at two positions, i.e., both long-axis ends of the ellipse. When the wave generator 44 rotates, positions where the external teeth 43a mesh with the internal teeth 42a move along the circumferential direction, and relative rotation that corresponds to the difference between the numbers of teeth of the two gears 42, 43 occurs therebetween.

The externally toothed gear 43 has a diaphragm 43c extending radially from one first end of the cylindrical part 43b, and a rigid annular boss 43d formed on the inner-peripheral edge of the diaphragm 43c. The external teeth 43a are formed on another second-end-side portion of the cylindrical part 43b.

The wave generator 44 has a wave generator plug 45 having an ellipsoidal outer-peripheral surface 45a, a plug reinforcement part 46 arranged in order to increase the rigidity of the wave generator plug 45, and a wave generator bearing 47 mounted between the ellipsoidal outer-peripheral surface 45a and an inner-peripheral surface of the cylindrical part 43b of the externally toothed gear 43.

The wave generator plug 45 has a plug cylindrical part 45b on which the ellipsoidal outer-peripheral surface 45a is formed, a discoid rib 45c extending radially inward from an inner-peripheral surface of the plug cylindrical part 45b, and an inner-side cylindrical part 45d formed coaxially in a central portion of the rib 45c. A shaft hole 45e is formed in the inner-side cylindrical part 45d, the shaft hole 45e extending therethrough.

The plug reinforcement part 46 is an annular portion formed continuously with an end of the plug cylindrical part 45b on the side toward the diaphragm 43c of the externally toothed gear 43. The radial-direction wall thickness of the plug reinforcement part 46 is greater than the wall thickness of the plug cylindrical part 45b. In the present example, the plug reinforcement part 46 comprises a circular inner-peripheral surface 46a having the same diameter as the plug cylindrical part 45b. The plug reinforcement part 46 also has a circular outer-peripheral surface 46b having an outside diameter larger than the long axis of the ellipsoidal shape that defines the ellipsoidal outer-peripheral surface 45a of the plug cylindrical part 45b.

The plug reinforcement part 46 can be used as a counterweight of the wave generator plug 45. In such cases, for example, the outer-peripheral surface of the plug reinforcement part 46 is formed not as a circular outer-peripheral surface but rather as an ellipsoidal outer-peripheral surface having a phase difference of 90 degrees about a center axis 41a with respect to the ellipsoidal outer-peripheral surface 45a of the wave generator plug 45.

There may be cases where, in order to reduce the weight and inertia of the wave generator plug 45, the wall thickness of the plug cylindrical part 45b, the rib 45c, etc., is reduced, these elements being constituent portions of the wave generator plug 45. When these portions are formed so as to have a low wall thickness, the rigidity of the wave generator plug 45 will decrease, and there may be cases where it is impossible to ensure the rigidity required in order for the externally toothed gear 43 to flex in an ellipsoidal shape and reliably mesh with the internally toothed gear 42. In the present example, in order to reinforce the wave generator plug 45, an end of the plug cylindrical part 45b is extended in the center-axis 41a direction, and the extended portion is formed as the high-wall-thickness plug reinforcement part 46. Due to the plug reinforcement part 46, the required rigidity is imparted to the wave generator plug 45. Any increase in weight and inertia due to the plug reinforcement part 46 is minimized, whereby it is possible to reduce the weight of the wave generator plug 45, and at the same time to ensure rigidity and prevent or suppress any reduction in ratcheting torque.

The invention claimed is:

1. A hollow strain-wave gear device comprising:
   a rigid internally toothed gear;
   an externally toothed gear arranged coaxially inside the internally toothed gear, the externally toothed gear having a flexible cylindrical part on which are formed external teeth capable of meshing with internal teeth of the internally toothed gear;
   a wave generator arranged coaxially inside the cylindrical part of the externally toothed gear, the wave generator causing the cylindrical part to flex in an ellipsoidal shape and mesh with the internal teeth of the internally toothed gear at two circumferential-direction locations, and, when driven so as to rotate, causing the positions where the external teeth mesh with the internal teeth to move along the circumferential direction; and
   a hollow rotating shaft coaxially extending through the wave generator,
   the wave generator having:
   a wave generator plug provided with an ellipsoidal outer-peripheral surface;
   a plug reinforcement part arranged in order to increase a rigidity of the wave generator plug; and
   a wave generator bearing mounted between the ellipsoidal outer-peripheral surface and an inner-peripheral surface of the cylindrical part of the externally toothed gear,
   a shaft portion that defines the wave generator plug and a shaft portion that defines the plug reinforcement part being formed integrally with the hollow rotating shaft,
   the plug reinforcement part being formed in the hollow rotating shaft at a position adjacent to the wave generator plug in a center-axis direction of the hollow rotating shaft,
   the radial-direction wall thickness of the plug reinforcement part being greater than the radial-direction wall thickness of the wave generator plug,
   wherein:
   an inner-peripheral surfaces of the wave generator plug and the plug reinforcement part are circular inner-peripheral surfaces having a same diameter at individual positions along a center-axis direction,
   an outer-peripheral surface of the plug reinforcement part is formed so as to have an outside diameter greater than a long diameter of an ellipsoidal shape that defines the ellipsoidal outer-peripheral surface of the wave generator plug at individual positions along the center-axis direction, and
   the outer-peripheral surface of the plug reinforcement part is an ellipsoidal outer-peripheral surface having a phase difference of 90 degrees about the center axis with respect to the ellipsoidal outer-peripheral surface of the wave generator plug.

2. The hollow strain-wave gear device according to claim 1,
   wherein the externally toothed gear is a cup-shaped or top-hat-shaped externally toothed gear;
   the externally toothed gear has a diaphragm extending from a first end of the cylindrical part in a radial direction and a rigid annular boss formed on an outer-peripheral edge or an inner-peripheral edge of the diaphragm, the external teeth being formed in a portion at a side of a second end of the cylindrical part;
   the wave generator plug is arranged inside the cylindrical part and at a position corresponding to the external teeth; and
   the plug reinforcement part is arranged inside the cylindrical part and at a position adjacent to a side of the first end with respect to the wave generator plug.

* * * * *